United States Patent [19]
Yap et al.

[11] Patent Number: 5,435,369
[45] Date of Patent: Jul. 25, 1995

[54] TRUCK TIRE WITH SPLIT OVERLAY

[75] Inventors: Pedro Yap, Stow, Ohio; Alan P. Dale, Shropshire, England; Guy Dauphin, Luxembourg, Luxembourg

[73] Assignee: The Goodyear Tire & Rubber Company, Akron, Ohio

[21] Appl. No.: 347,779

[22] Filed: Nov. 29, 1994

Related U.S. Application Data

[63] Continuation-in-part of Ser. No. 867,589, Apr. 13, 1992, abandoned.

[51] Int. Cl.⁶ ............... B60C 3/00; B60C 9/02; B60C 9/20; B60C 9/28
[52] U.S. Cl. ............... 152/454; 152/526; 152/527; 152/531; 152/532; 152/533; 152/538; 152/548
[58] Field of Search ............... 152/526–527, 152/531–536, 454, 538, 548; 156/117

[56] References Cited

U.S. PATENT DOCUMENTS

| | | | |
|---|---|---|---|
| 4,135,565 | 1/1979 | van der Burg | 152/531 X |
| 4,140,168 | 2/1979 | Caretta | 152/536 X |
| 4,146,415 | 3/1979 | Caretta et al. | 152/531 X |
| 4,293,019 | 10/1981 | Maiocchi | 152/531 X |
| 4,407,347 | 10/1983 | Mirtain | 152/536 x |
| 4,420,025 | 12/1983 | Ghilardi et al. | 152/536 X |
| 4,690,191 | 9/1987 | Kawasaki | 152/527 |
| 4,762,158 | 8/1988 | Furuya et al. | 152/536 X |
| 4,883,108 | 11/1989 | Takahashi et al. | 152/531 |
| 4,952,260 | 8/1990 | Oda | 156/117 X |
| 5,042,546 | 8/1991 | Forney et al. | 152/532 X |

FOREIGN PATENT DOCUMENTS

| | | | |
|---|---|---|---|
| 57-26003 | 2/1982 | Japan | 152/536 |
| 4-31107 | 2/1992 | Japan | 152/536 |

*Primary Examiner*—Adrienne C. Johnstone
*Attorney, Agent, or Firm*—David E. Wheeler

[57] ABSTRACT

A medium pneumatic truck tire (10), has a belt package (18) comprising a plurality of belt plies (20, 22, 24, 26). The tread (16) of the tire is 200 to 380 mm wide (8 inches to 15 inches). In the shoulder area (31) of the tire, an overlay strip (32) is abutted against belt edge (34) of top belt (26) and is disposed over belt edge (33) of the adjacent belt (24). The overlay strip (32) is applied in two layers, and the reinforcing cords (38) therein have an angle of about 0° with respect to the equatorial plane of the tire (10). The overlay strip (32) is about 51 mm (2 inches) wide and has an overlap splice of about 40 mm (1.5 inches). The overlay strip (32) overlaps belt edge (36) by 15 to 20 mm (0.5 to 0.75 inch).

6 Claims, 2 Drawing Sheets

TRUCK TIRE WITH SPLIT OVERLAY

BACKGROUND OF THE INVENTION

This application is a Continuation-In-Part of U.S. Ser. No. 07/867,589, filed Apr. 13, 1992, now abandoned.

This invention relates to a pneumatic truck tire having belt-edge reinforcement which prevents belt-edge separation and provides a means for preventing damage to the carcass when tires are ground for retreading.

Together with other features of the tire, the invention reduces stresses in the pneumatic tire's belt-edge areas and provides significantly greater uniformity of displacement (growth) in the tire's radial dimensions as a result of its inflation from atmospheric or low pressure to a normal pressure accommodating its normal load. In a preferred aspect of the invention, the broken-in radial tire will have increases in all of its exterior dimensions (except those restrained by the rim on which it is mounted) upon normal inflation of the tire.

Pneumatic tires experience change in their dimensions when mounted on a wheel and rim and inflated from atmospheric pressure (or the low pressure required to maintain its beads firmly seated on the rim with slight tensile stress on the carcass cords) to normal inflation pressure. This dimensional change upon inflation from atmospheric pressure to normal tire pressure in radial-ply pneumatic tires typically has nonuniform characteristics. Typical of the tread surface is an increase in, or displacement of, its radial dimensions as measured from the tire's axis of rotation. These increases in the radial dimensions tend to be nonuniform as the radial measurements are made progressively from the tire's equatorial plane to the lateral edges of its tread. The radial-ply tire undergoes a greater percentage increase in its radial dimensions as measurements proceed toward the tread's lateral edges. This excessive growth in the shoulder, or tread-edge areas upon inflation, contributes to stress concentrations in the edges of the belt plies underlying the tire tread and also can lead to rapid and uneven tread wear during normal tire use. Footprints of tires having this excessive growth characteristic tend to be of "butterfly" shape due to greater unit pressures at the tread shoulders under normal tire loads. This footprint characteristic tends to become worse after the tire has been broken-in by use and is more pronounced and difficult to correct as a function of decreasing aspect ratio.

SUMMARY OF THE INVENTION

The invention relates to a pneumatic truck tire having a pair of axially spaced annular beads, a plurality of carcass plies wrapped around said beads, a plurality of belt plies disposed over the carcass plies in a crown area of the tire, tread rubber having a width of 200 mm to 380 mm (8 to 15 inches) disposed over the belt plies, sidewalls disposed between the tread rubber and the beads wherein the sidewalls and tread rubber meet in shoulder areas of the tire, and an overlay strip having a width of 25 mm to 76 mm (1 to 3 inches) disposed over belt plies in each shoulder area of the tire. The overlay strip comprises an elastomeric material which has parallel reinforcing cords therein, and the overlay strip is disposed in the tire such that the parallel reinforcing cords have a 0° angle with respect to the equatorial plane of the tire. The overlay comprises two turns of the strip. In the illustrated embodiment, the overlay strip is laid down to have an overlapped splice of 30 mm to 50 mm (1.2 to 2 inches). A specific tire of the invention has four belt plies and the overlay strip is abutted against a ply edge of a radially outermost top belt ply. The tire also has a gum rubber wedge disposed between axially outer belt edges of a second and third belt ply and the overlay strip overlaps the wedge beyond the edge of the widest belt ply.

In a specific tire of the invention, for use on paved surfaces, the tire comprises a carcass having at least one radial ply, a belt structure radially outward of and circumferentially surrounding the carcass to provide circumferential restriction of the carcass shape, and a tire tread having a width in the range of 65% to 80% of the tires maximum section width. The tire has an elastomeric wedge radially interposed between the carcass and the tread for imparting a reverse curvature to the radial carcass ply when the carcass is mounted on its design rim and normally inflated. An overlay strip having a width of 15 to 20% of the tread width is provided on each edge of the belt structure for belt-edge support. The tire, when mounted on its design rim without load, undergoes uniform growth in the radial dimensions as measured from the tires axis of rotation when its inflation pressure is increased from atmospheric pressure to normal pressure. The radial displacement laterally across the tread surface is uniform within ±25% of the radial displacement of the tread surface at the equatorial plane. The reverse curvature is in a region within 2 points in the tire profile centered about and on the opposite sides of the equatorial plane. The respective points are located at maximum radial dimensions of the carcass ply on the respective sides of the equatorial plane, and the maximum radial dimension is respectively axially inward of both the lateral edges of the belt structure and centers of annular tensile members located in beads of the tire. Dimensions between the carcass and the belt structure continually decrease as a function of axial distance from the equatorial plane in the region between the two points. The radially innermost ply of the belt structure has a cord angle in the range of 17° to 27° with respect to the equatorial plane and is in contact with the radially outer surfaces of the wedge. The tire has an aspect ratio less than or equal to 75%.

DEFINITIONS

The invention also may be better understood in the context of the following definitions, which are applicable both to the specification and to the appended claims:

"Pneumatic Tire" means a laminated mechanical device of generally toroidal shape (usually an open-torus) having beads and a tread and made of rubber, chemicals, fabric and steel or other materials. When mounted on the wheel of a motor vehicle, the tire through its tread provides traction and contains the fluid that sustains the vehicle load.

"Equatorial plane" (EP) means the plane perpendicular to the tire's axis of rotation and passing through the center of its tread.

"Cord" refers to the strands reinforcing the plies in the tire.

"Cord angle" means the angle, left or right in a plan view of the tire, formed by a cord with respect to the equatorial plane.

"Ply" means a layer of rubber-coated parallel cords.

"Bead" means that part of the tire comprising an annular tensile member wrapped by ply cords and shaped, with or without other reinforcement elements such as flippers, chippers, apexes, toe guards and chafers, to fit the design rim.

"Radial-ply tire" means a belted or circumferentially-restricted pneumatic tire in which the ply cords which extend from bead to bead are laid at cord angles between 65° and 90° with respect to the equatorial plane of the tire.

"Rim" means a support for a tire or a tire and tube assembly upon which the tire beads are seated.

"Carcass" means the tire structure apart from the belt structure, tread, undertread, and sidewall rubber over the plies, but including the beads.

"Belt structure" means at least two layers or plies of parallel cords, woven or unwoven, underlying the tread, unanchored to the bead, and having both left and right cord angles in the range from 17° to 27° with respect to the equatorial plane of the tire.

"Sidewall" means that portion of a tire between the tread and the bead.

"Tread" means that portion of a tire that comes into contact with the road when the tire is normally inflated and under normal load.

"Tread width" means the arc length of the tread surface in the axial direction, that is, in a plane passing through the axis of rotation of the tire.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Section height" means the radial distance from the nominal rim diameter to the outer diameter of the tire at its equatorial plane.

"Aspect ratio" of the tire means the ratio of its section height to its section width, multiplied by 100% for expression as a percentage.

"Inflection point" means a point in a curved path at which its direction of curvature changes, that is, the center of curvature shifts from one side of the path to the other. An example of an inflection point is the center of the letter "S".

"Innerliner" means the layer or layers of elastomer or other material that form the inside surface of a tubeless tire and that contain the inflating fluid within the tire.

"Footprint" means the contact patch or area of contact of the tire tread with a flat surface at zero speed and under normal load and pressure or under specified load, pressure and speed conditions.

The modern radial-ply pneumatic tire is designed under standards promulgated by any of several organizations, including The Tire and Rim Association, Inc., The European Tyre & Rim Technical Organization and the Japan Automobile Tire Manufactures Association. Under the standards of these and other organizations, which are quite similar, when a tire of a given size is being designed, it is designed to be mounted on a "design rim", which is a rim having a specified configuration and width. The "design rim width" is the specific commercially available rim width assigned to each tire size and typically is between 70 and 75% of the specific tire's section width. The "tire design load" is the base or reference load assigned to a tire at a specific inflation pressure and service condition; other load-pressure relationships applicable to the tire are based upon that base or reference load. The terms "normal inflation pressure" and "normal load" as used herein refer respectively to the specific design inflation pressure and load assigned by the appropriate standards organization for the service condition for the tire.

DETAILED DESCRIPTION OF THE INVENTION

Cord/rubber composite reinforcement strips are provided in the belt edge area of medium truck tires. The reinforcement strips reduce belt edge strain levels by restricting circumferential growth in the shoulder region of the tire or by distributing the belt edge stresses over a greater area.

The belt edge reinforcement strip is a cord/rubber composite material wherein the cord reinforcement is steel wire, aramid, nylon, polyester or polyalkylene. In the preferred embodiment, nylon cord is used.

Specifically, in the illustrated embodiment, the overlay strip comprises 840/2 nylon 6.6 cords that have an untreated gage of 0.56 mm, and a composite gage of 0.80 mm (0.12 mm rubber added to each side of the overlay fabric).

The cords in the reinforcement strip are oriented at from 0° to 55° relative to the equatorial plane of the tire. In the illustrated embodiment, a 0° to 5° cord angle is used.

It is believed that tires made with a 0° cord angle reinforcement in the overlay strip will demonstrate improved durability, whereas reinforcement strips having a 55° cord angle with respect to the equatorial plane will demonstrate improved handling.

The invention relates generally to a pneumatic truck tire having a pair of axially spaced annular beads, a plurality of carcass plies wrapped around said beads, a plurality of belt plies disposed over the carcass plies in a crown area of the tire, tread rubber having a width of 200 to 450 mm (8 to 18 inches), preferably 200 to 380 mm (8 to 15 inches) disposed over the belt plies, and sidewalls disposed between the tread rubber and the beads. The sidewalls and tread rubber meet at the shoulder of the tire, and an overlay strip having a width of 25 to 76 mm (1 to 3 inches) is disposed over the belt structure in each shoulder of the tire. The overlay comprises at least one turn of the cord reinforced overlay strip around the circumference of the tire. In the illustrated embodiment, the overlay strip is laid down to have an overlapped splice of 30 mm to 50 mm (1.2 to 2 inches). An illustrated tire of the invention has four belt plies and the overlay strip is abutted against a ply edge of a radially outermost top belt ply. The tire also has a gum rubber wedge disposed between axially outer belt edges of a second and third belt ply and the overlay strip overlaps the wedge beyond the edge of the widest belt ply.

Figure 1:
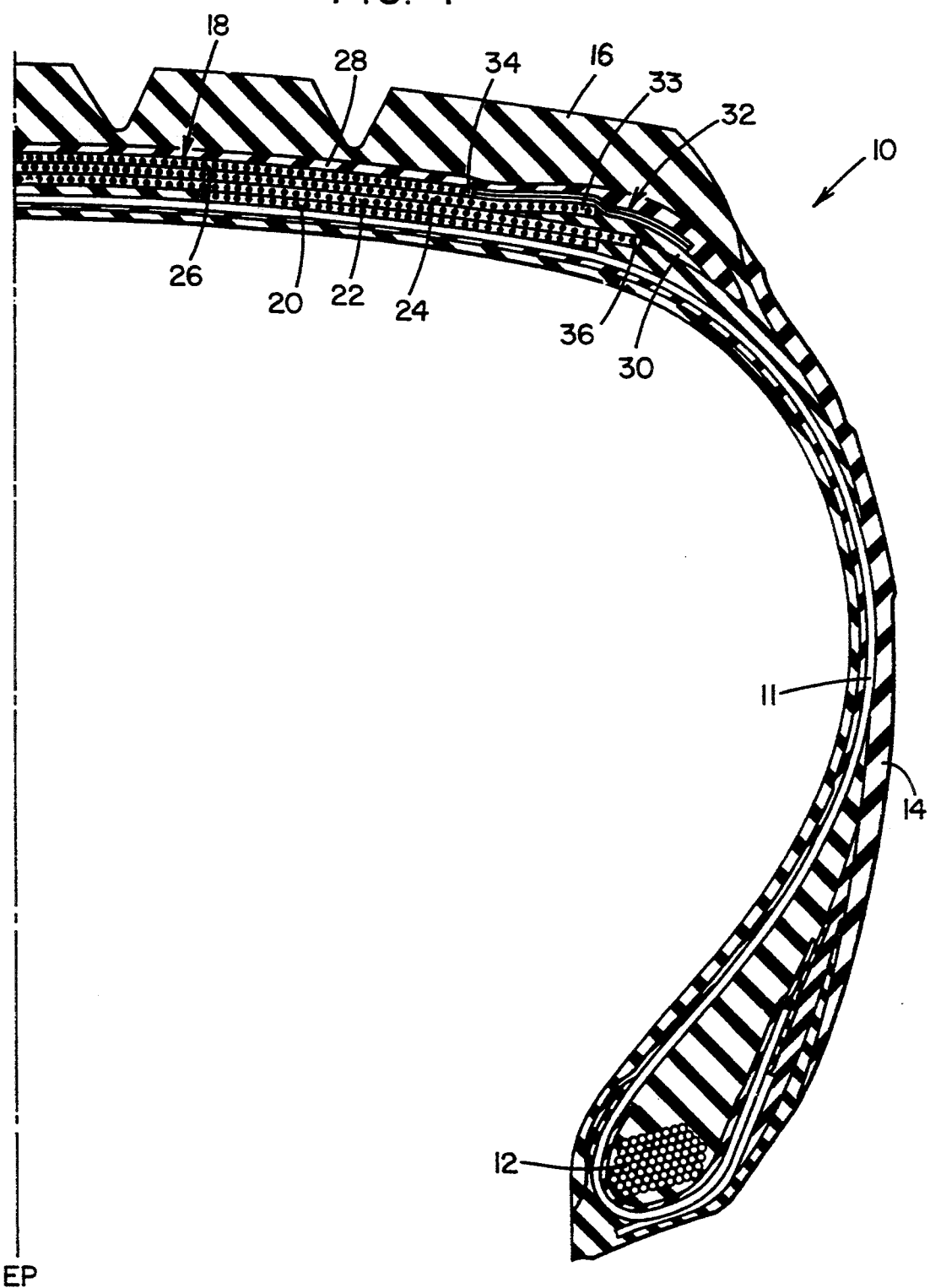
FIG. 1 is a cross-section view of the illustrated embodiment of the tire.
Figure 2:
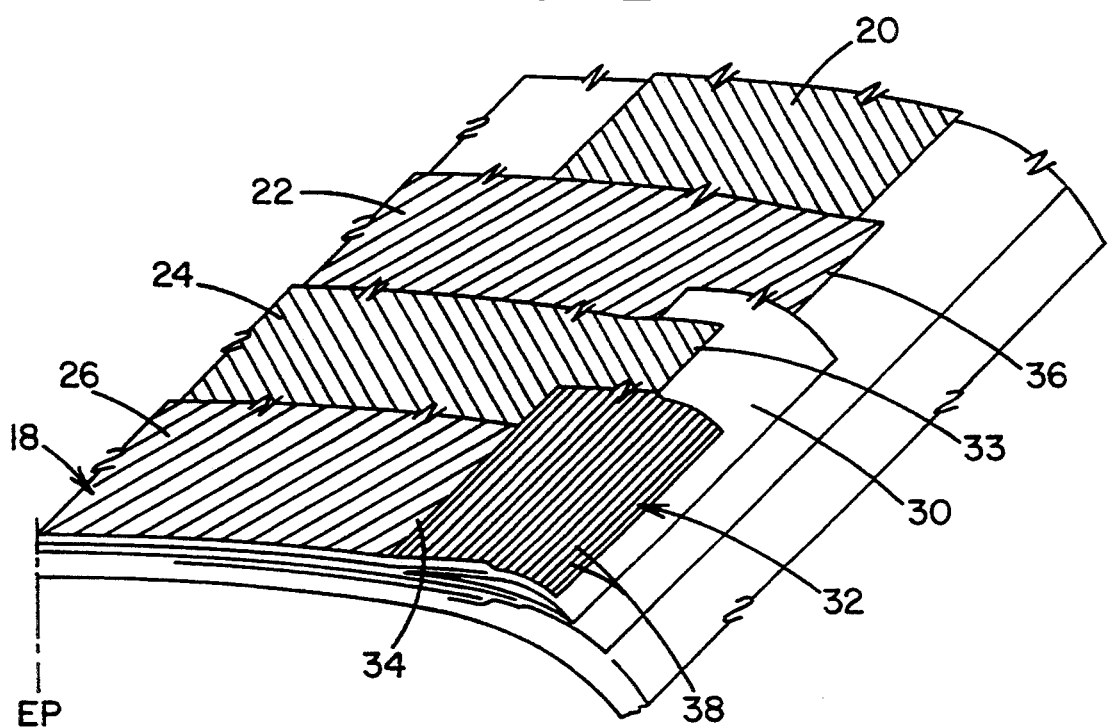
FIG. 2 is an elevated partial view of the belt area of the tire.
Figure 3:
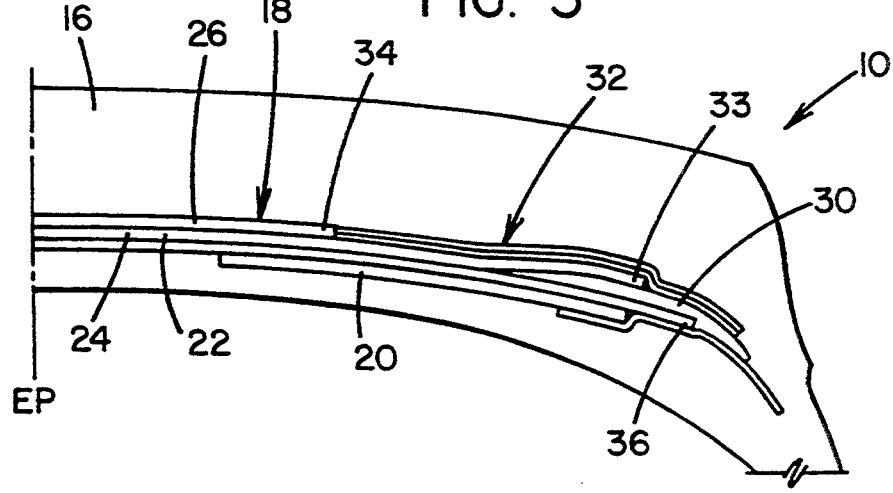
FIG. 3 is an enlarged cross-section view of a portion of the belt area of the tire.

With reference now to FIGS. 1 and 2, the tire of the invention, in the illustrated embodiment, is what is known as a super single as is described in commonly assigned U.S. application No. 07/384,119 filed Jul. 24, 1989, now U.S. Pat. No. 5,042,546, incorporated herein by reference. In the tire, carcass plies 11 are wrapped around beads 12 and belt package 18 is disposed over the carcass plies in a crown area of the tire. Tread 16 is disposed over belt package 18, and sidewalls 14 are disposed between tread 16 and bead 12. A tread base 28 may be disposed between tread 16 and belt package 18. In the illustrated embodiment, belt package 18 comprises a radially innermost first belt ply 20 (belt 1) and adjacent thereto a second belt ply 22 (belt 2), and a radially outermost top belt ply 26 (belt 4) and an adjacent radially inward belt ply 24 (belt 3). A gum rubber wedge 30 is disposed between the outer ply edges 33 (of belt 3) and 36 (of belt 2). As best illustrated in FIG. 3, overlay strip 32 is disposed over belt 3 and over wedge 30 extending beyond the outer edge 33 of belt 3 by 25% to 75% of the strip width.

The overlay strip comprises a sufficient number of layers or turns needed to have a thickness of fabric which, when abutted against the outer edge 34 of the top belt, has substantially the same radially outward dimension as the top belt. In the illustrated embodiment, the overlay strip comprises two layers or turns of the overlay strip. The overlay strip 32 is about 51 mm (2 inches) wide and extends about 15 mm (0.6 inch) beyond belt edge 36 of belt 2 (about 20 mm (0.9 inch) beyond the edge 33 of belt 3), and onto the wedge 30. There is an overlap of 40 mm in the overlap splice.

Figure 4:
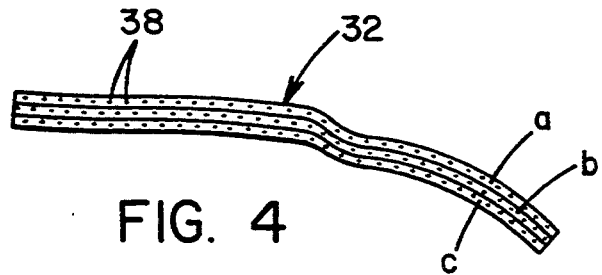
FIG. 4 illustrates the overlap splice area of the overlay strip.

As is illustrated in FIG. 4, the overlay strip is laid up having an overlap splice. Those skilled in the art will recognize that in the area of an overlap splice there are three layers, illustrated as a, b, and c in the figure, of overlay material. The 0° angled reinforcing cords are illustrated as 38 in the figure.

An overlap splice is used to ensure that there are no gaps to weaken the overlay strip and to ensure that no air is trapped in the area of the overlay strip. Trapped air would lead to the possibility of ply separations. For the same reason, to prevent trapping of air, it is preferred that the overlay strip abut the edge of the top belt. Those skilled in the art will recognize, however, that if means are provided to prevent trapping of air, overlap of the top belt with the overlay strip and the use of a butt splice, would be possible.

In the illustrated embodiment, which applies to tires having an aspect ratio less than or equal to 75% and a tread width in the range from 65% to 80% of the tire's section width, a radial tire for use on paved road surfaces has elastomeric means for imparting a reverse curvature to the tire's radial carcass (and also to its belt structure where the tire has at least two radial plies with right and left cord angles in the range from 65° to 80°).

The reverse curvature is in a region between two points in the tire profile centered about and on opposite sides of the equatorial plane of the tire. The tire carcass ply or plies at the equatorial plane have a radial dimension from the tire's axis of rotation that is less than the radii at the aforementioned two points, which are located at respected maximum radial dimensions of the carcass ply on opposite sides of the equatorial plane. The reverse curvature results in the presence of inflection points in the region of such curvature. The inflection points also are equally spaced from the equatorial plane. The points of maximum radial dimension to the carcass ply or plies are respectively located axially inwardly of both the lateral edges of the belt structure and the centers of the annular tensile members in the beads of the tire when mounted on its design rim and normally inflated. Dimensions between the carcass and the belt structure continually decrease as a function of axial distance from the equatorial plane in the region between the two points in the tire profile.

The illustrated radial-ply pneumatic tire is configured with one or two "radial" plies as its carcass; these plies have cord angles respectively directed left and right at angles in the range from 65° to 80°. This construction is particularly suitable for light-truck vehicles and is used with a belt structure having two or more plies. A wedge of elastomeric material is used to impart a reverse curvature to the carcass, the reverse curvature making the carcass profile concave outwardly in a region centered about the equatorial plane. The elastomeric means for causing the reverse curvature can be an integral part of the tread or undertread material or can be a suitable member positioned between the belt structure and the carcass plies. If an elastomeric wedge is positioned above the belt structure, the belt structure also will have a reverse curvature centered about the equatorial plane.

The combination of the reverse curvature in the low-profile (75% or less aspect ratio) tire with the 65° to 80° "radial" carcass cords provides the opportunity to achieve a tire design having reduced belt-edge and bead-area stresses, uniform growth characteristics upon inflation, and simplified bead and lower sidewall construction due to the cord angles in the carcass plies. A tire of preferred form according to this aspect of the invention will have steel cords in its carcass plies, will have steel or aromatic polyamide (aramid) cord in its belt plies with cord angles less than or equal to 25°, and will have an aspect ratio of 65% or less.

The invention, when practiced in its preferred form, provides a belted "radial-ply" tire which has "natural shape" in its sidewall regions for whatever "radial" cord angle is selected for the carcass ply or plies. However, the tire also has natural shape in the portion of the radial carcass underlying its belt structure, but this natural shape is for a cord angle substantially equivalent to that or those low angles (in the range from 17° to 27°) used in the belt structure. Preferably the maximum value of the low cord angles is the critical angle of 25° rather than 27°.

The reverse curvature occurring between the spaced points of maximum radial dimension in the carcass of the radial-ply pneumatic tire is obtained with a wedge of elastomeric material formed between the tire's belt structure and carcass plies. Alternatively, in a preferred tire structure having two plies of cords at angles in the range from 65° to 80°, the wedge can also be placed above the tire's belt structure to impart reverse curvature to both it and the carcass.

In a specific tire of the invention, for use on paved surfaces, the tire comprises a carcass having at least one radial ply, a belt structure radially outward of and circumferentially surrounding the carcass to provide circumferential restriction of the carcass shape and a tire tread having a width in the range of 65% to 80% of the tires maximum section width. The tire has an elastomeric wedge radially interposed between the carcass and the tread for imparting a reverse curvature to the radial carcass ply when the carcass is mounted on its design rim and normally inflated. An overlay strip having a width of 15 to 20% of the tread width is provided on each edge of the belt structure for belt-edge support. The tire, when mounted on its design rim without load, undergoes uniform growth in the radial dimensions as measured from the tires axis of rotation when its inflation pressure is increased from atmospheric pressure to normal pressure. The radial displacement laterally across the tread surface is uniform within ±25% of the radial displacement of the tread surface at the equatorial plane. The reverse curvature is in a region within 2 points in the tire profile centered about and on the opposite sides of the equatorial plane. The respective points are located at maximum radial dimensions of the carcass ply on the respective sides of the equatorial plane, and the maximum radial dimension is respectively axially inward of both the lateral edges of the belt structure and centers of annular tensile members located in beads of the tire. Dimensions between the carcass and the belt structure continually decrease as a function of axial distance from the equatorial plane in the region between the two points, the radially innermost ply of the belt structure having a cord angle in the range of 17° to 27° with respect to the equatorial plane and being in contact with the radially outer surfaces of the wedge. The tire has an aspect ratio less than or equal to 75%.

The invention is further illustrated with reference to the following examples.

EXAMPLE 1

Over 45 tires (295/75R22.5 G159) featuring either angled nylon BER (belt edge reinforcement) or zero degree nylon overlays were tested for crown durability at high load on a 120" smooth wheel. The tires also underwent a high speed test on a 67" smooth wheel. The following results were achieved.

|  |  | FAILURE MILEAGES (*) | | |
|---|---|---|---|---|
| 120" smooth wheel | CONTROL | 15,310F | 15,700F | 10,688F |
|  | 55 deg BER | 20,099F | 18,095F | 14,992F |
|  | 35 deg BER | 18,118F | 13,461F |  |
|  | 45 deg BER | 16,804F |  |  |
|  | 65 deg BER | 18,357F |  |  |
|  | 0 deg strips | 16,096F |  |  |

(*) Excluding tires removed due to bead area failures.

Hi-speed results for the BER tires were similar to those of the control. The tread on all tires failed with a heat separation within the c/l (centerline) tread rib. With the tread buffed off, all tires reached stop/finish with no separations.

EXAMPLE 2

| 385/65R22.5 G159 Retreadability "STANDARD" CONSTRUCTION | | | | |
|---|---|---|---|---|
| REMAINING NSK (mm) | | | | |
| INS | CENTER | OUT | | INSPECTION |
| GR1 | GR2 | GR3 | GR4 | RESULTS |
| 1. 3.5 | 4.0 | 45 | 3.0 | Slight BES (2 mm) one side only |
| 2. 2.0 | 4.5 | 4.0 | 1.8 | 6 mm BES |
| 3. 2.0 | 2.5 | 2.0 | 2.0 | OK |
| 4. 6.5 | 5.5 | 6.0 | 3.5 | Bkr end lifting |
| 5. 4.2 | 4.8 | 3.5 | 2.0 | 10 mm BES |
| 6. 6.0 | 5.5 | 5.5 | 6.0 | 3–4 mm BES |
| 7. 3.5 | 4.5 | 4.2 | 1.5 | 2 mm BES |
| 8. 5.2 | 6.2 | 5.8 | 4.2 | 4 mm BES |
| 9. 3.0 | 6.0 | 5.5 | 2.0 | 5–7 mm BES |
| 10. 3.5 | 5.0 | 5.0 | 3.0 | OK |
| 11. 4.0 | 5.0 | 5.0 | 4.0 | 3–5 mm BES |
| 12. 3.0 | 3.0 | 3.5 | 2.0 | 2 mm BES |

GR1, GR2, GR3, GR4 represent the four grooves on the tire and the numbers under each is a measurement of the groove depth in mm. BES refers to belt edge separation. BKR means breaker.

| 385/65R22.5 G159 Retreadability "BER" CONSTRUCTION | | | | TIRE POSITION LEFT/ RIGHT & AXLE | |
|---|---|---|---|---|---|
| REMAINING NSK (mm) | | | | | |
| INS | CENTER | OUT | | | |
| GR1 | GR2 | GR3 | GR4 | | |
| 1. 2.8 | 2.8 | 2.8 | 2.5 | L | 3 |
| 2. 6.0 | 5.2 | 4.5 | 4.0 | L | 3 |
| 3. 5.0 | 5.2 | 5.0 | 4.5 | L | 3 |
| 4. 4.2 | 4.5 | 4.0 | 3.0 | R | 3 |
| 5. 5.0 | 5.2 | 5.0 | 3.5 | R | 3 |
| 6. 4.0 | 3.8 | 3.8 | 3.8 | R | 3 |
| 7. 5.2 | 5.0 | 4.0 | 2.5 | L | 1 |
| 8. 5.0 | 5.0 | 4.8 | 4.0 | R | 1 |
| 9. 5.5 | 5.0 | 4.0 | 3.0 | R | 3 |
| 10. NOT MEASURED AD = TREAD PERFORATION | | | | | |
| 11. 3.0 | 4.0 | 3.0 | SMOOTH | R | 3 |
| 12. 3.5 | 4.0 | 4.0 | 3.5 | L | 3 |
| 13. 3.0 | 4.0 | 4.0 | 3.0 | L | 3 |
| 14. 5.5 | 5.5 | 4.5 | 3.5 | L | 1 |
| 15. REGROOVED | | | | R | 2 |
| 16. 5.0 | 5.5 | 5.5 | 5.0 | L | 3 |

Notes:
*No BES detected
*Very limited information on mileage performance since no HUBDOMETER available on trailers.
*All casings OK for retreading (except the one accidental damage). Smooth in the table means that no non-skid was left on the tire (0 groove depth).

Two additional sets of the subject tire have been visually inspected and buffed for retreading in a pre-cured process.

SET 1: 12 tires out of "Standard" construction
SET 2: 16 tires "BER" (belt edge reinforcement) construction (2 nylon layers)

The findings are in line with previous results: no belt edge separation (BES) detected on BER construction tires.

SET 1: 3 OK for retreading (25%)
SET 2: All tires OK for processing (100%) (1 AD not counted)

Reduced circumferential tire growth is provided by the restrictive capability of the cord/rubber belt edge reinforcing strip. Placement of the reinforcing strip only at the belt edge area of the tire concentrates growth restriction in the critical region of the tire crown. The resulting decrease in belt edge strain levels improves the tires resistance to developing belt edge separations. Laboratory results on the 120 inch flywheel crown durability test indicates higher mileage to failure using belt edge reinforcing strips.

The overlay strip also serves as a marker during buffing in the retreading operation. When the overlay strip is detected during buffing, the operator is aware that the belt package is near. This helps prevent damage to the edges of the belt package during buffing.

EXAMPLE 3

This example illustrates the improvements in the properties of tires made using the instantly claimed construction. The following table shows that in tires, size 385/65R22.5, made in the two years before April 1992 without belt edge reinforcement, there were almost three times as many tread separations in about one-half the number of tires when compared with tires of the invention made in the two years after April 1992. Also, vibration was significantly reduced in the tires of the invention, but tread chipping increased.

TABLE 1

| | 385/65R22.5 G159 & MT2 | |
|---|---|---|
| SIZE | 2 YEARS BEFORE APRIL 1992 | 2 YEARS AFTER APRIL 1992 |
| Vibration | 20 | 10 |
| SW Bulge | 125 | 182 |
| Tread Seps | 1198 | 411 |
| Bead Seps | 115 | 228 |
| Wear Complaints | 154 | 246 |
| Thin Liner | 59 | 60 |
| Tread Chipping | 28 | 223 |
| Others | 322 | 532 |
| Total | 2021 | 1892 |
| Production | 139,940 | 267,427 |

Although specific embodiments of the invention have been illustrated and described, those skilled in the art will recognize that the invention may be variously modified and practiced without departing from the spirit of the invention. The invention is limited only by the following claims.

What is claimed is:

1. A pneumatic truck tire comprising a pair of axially spaced annular beads, a plurality of carcass plies wrapped around said beads, four belt plies disposed over said carcass plies in a crown area of said tire, tread rubber having a width of 200 to 450 mm (8 to 18 inches) disposed over said belt plies, and sidewalls disposed between said tread rubber and said beads, said sidewalls and tread rubber meeting in shoulder areas of said tire, and two turns of an overlay strip having a width of 25 to 76 mm (1 to 3 inches) disposed in each shoulder area of said tire, wherein said two turns of overlay strip are laid down to have an overlap splice of 30 mm to 50 mm and said overlay strip is abutted against a ply edge of a radially outermost top belt ply, and wherein a gum rubber wedge is disposed between axially outer belt edges of a second and third belt, and said overlay strip overlaps said wedge.

2. The pneumatic tire of claim 1 in which said overlay comprises a strip of elastomeric material which has parallel reinforcing cords which are disposed at 0° to 55° with respect to the equatorial plane of the tire.

3. The pneumatic tire of claim 1 in which said overlay comprises a strip of elastomeric material which has parallel reinforcing cords which are disposed at 0° to 5° with respect to the equatorial plane of the tire.

4. The pneumatic tire of claim 1 in which radially innermost first belt ply is narrower in width than the next adjacent second belt ply and the top belt ply and its next adjacent third belt ply are narrower in width than said second belt ply and said overlay strip extends beyond an edge of said second belt ply.

5. A radial-ply pneumatic tire for use on paved surfaces, the tire comprising a carcass having at least one radial ply, a belt structure comprising four belt plies radially outward of and circumferentially surrounding the carcass to provide circumferential restriction of the carcass shape and a tire tread having a width in the range of 65% to 80% of the tire's maximum section width, the tire having an elastomeric wedge radially interposed between the carcass and the tread for imparting a reverse curvature to the radial carcass ply when the tire is mounted on its design rim and normally inflated and characterized by an overlay strip having a width of 15% to 20% of the tread width on each edge of said belt structure for belt edge support in which two turns of overlay strip are laid down on each edge to have an overlay splice of 30 mm to 50 mm and said overlay strip is abutted against a radially outermost top belt ply and wherein said gum rubber wedge is disposed between axially outer belt edges of a second and third belt and said overlay strip overlaps said wedge, such that the tire when mounted on its design rim without load undergoes uniform growth in the radial dimensions as measured from the tire's axis of rotation of its tread surface when its inflation pressure is increased from atmospheric pressure to normal pressure, the radial displacement laterally across the tread surface being uniform within plus or minus 25% of the radial displacement of the tread surface at the equatorial plane, the reverse curvature being a region between two points in the tire profile centered about and on opposite sides of the equatorial plane, the respective points being located at maximum radial dimensions of the carcass ply on the respective sides of the equatorial plane, the points of maximum radial dimension being respectively located axially inwardly of both the lateral edges of the belt structure and the centers of annular tensile members located in beads of the tire, dimensions between the carcass and the belt structure continually decreasing as a function of axial distance from the equatorial plane in the region between the two points, the radially innermost ply of the belt structure having a cord angle in the range from 17° to 27° with respect to the equatorial plane and being in contact with the radially outer surfaces of the wedge, the tire having an aspect ratio less than or equal to 75%, and wherein said overlay comprises a strip of elastomeric material which has parallel reinforcing cords which are disposed at 0° to 55° with respect to the equatorial plane of the tire.

6. The pneumatic tire of claim 5 in which a radially innermost first belt ply is narrower in width than the next adjacent second belt ply and the top belt ply and its next adjacent third belt ply are narrower in width than said second belt ply and said overlay strip extends beyond an edge of said second belt ply.

* * * * *